(12) United States Patent
Fukuda Kelley et al.

(10) Patent No.: US 10,339,173 B2
(45) Date of Patent: Jul. 2, 2019

(54) CONTENT AGGREGATION

(75) Inventors: Yohko Aurora Fukuda Kelley, Woodinville, WA (US); Bruce Chester Bell, New York, NY (US)

(73) Assignee: Adobe Inc., San Jose, CA (US)

( * ) Notice: Subject to any disclaimer, the term of this patent is extended or adjusted under 35 U.S.C. 154(b) by 819 days.

(21) Appl. No.: 12/891,511

(22) Filed: Sep. 27, 2010

(65) Prior Publication Data

US 2013/0166471 A1 Jun. 27, 2013

(51) Int. Cl.
*G06Q 10/06* (2012.01)
*G06F 16/48* (2019.01)
*G06F 17/00* (2019.01)
*G06F 16/958* (2019.01)

(52) U.S. Cl.
CPC ............ *G06F 16/48* (2019.01); *G06F 16/958* (2019.01); *G06F 17/00* (2013.01); *G06Q 10/06* (2013.01)

(58) Field of Classification Search
USPC .................... 705/0.001, 1.1; 715/210; 726/3; 709/231; 707/3, 794, 204, 742; 455/466; 382/321; 380/201; 704/10
See application file for complete search history.

(56) References Cited

U.S. PATENT DOCUMENTS

| | | | | |
|---|---|---|---|---|
| 5,983,171 A * | 11/1999 | Yokoyama | ............ | G06F 16/319 704/10 |
| 6,047,296 A * | 4/2000 | Wilmott | ............. | G06F 17/2205 715/210 |
| 6,446,130 B1 * | 9/2002 | Grapes | ............... | G06Q 20/1235 709/231 |
| 7,266,775 B2 * | 9/2007 | Patitucci | ............... | G06F 16/252 715/735 |
| 8,516,358 B2 * | 8/2013 | Banker | .................. | G06F 16/94 715/205 |
| 2006/0053097 A1 * | 3/2006 | King | .................... | G06F 16/951 382/321 |
| 2007/0053513 A1 * | 3/2007 | Hoffberg | ....................... | 380/201 |
| 2007/0162432 A1 * | 7/2007 | Armstrong | ........... | G06Q 10/107 707/999.003 |
| 2007/0198612 A1 * | 8/2007 | Prahlad | ............. | G06F 16/24575 |
| 2009/0054092 A1 * | 2/2009 | Stonefield | .......... | G06Q 30/0601 455/466 |
| 2009/0217352 A1 * | 8/2009 | Shen | ................... | G06F 21/6218 726/3 |

(Continued)

*Primary Examiner* — Lynda Jasmin
*Assistant Examiner* — Kimberly L Evans
(74) *Attorney, Agent, or Firm* — SBMC

(57) ABSTRACT

Methods, systems, and apparatus, including computer programs encoded on a computer storage medium, can aggregate content from one or more electronic publication documents. In one aspect, a method includes obtaining information including an index to content items of an electronic publication including a discrete package of received data that is stored locally, the content items being less than all content in the electronic publication received; retrieving, by a computer based on one or more criteria, two or more of the content items provided in disparate portions of the electronic publication, including the discrete package of received data, using the index; and presenting the two or more of the content items together on an output device in a user interface format different from that of the electronic publication.

20 Claims, 9 Drawing Sheets

(56) References Cited

U.S. PATENT DOCUMENTS

2011/0219008 A1* 9/2011 Been .................. G06F 16/00
707/742
2011/0252065 A1* 10/2011 Ryu .................. G06F 17/3002
707/794
2011/0295844 A1* 12/2011 Sun et al. .................. 707/723

* cited by examiner

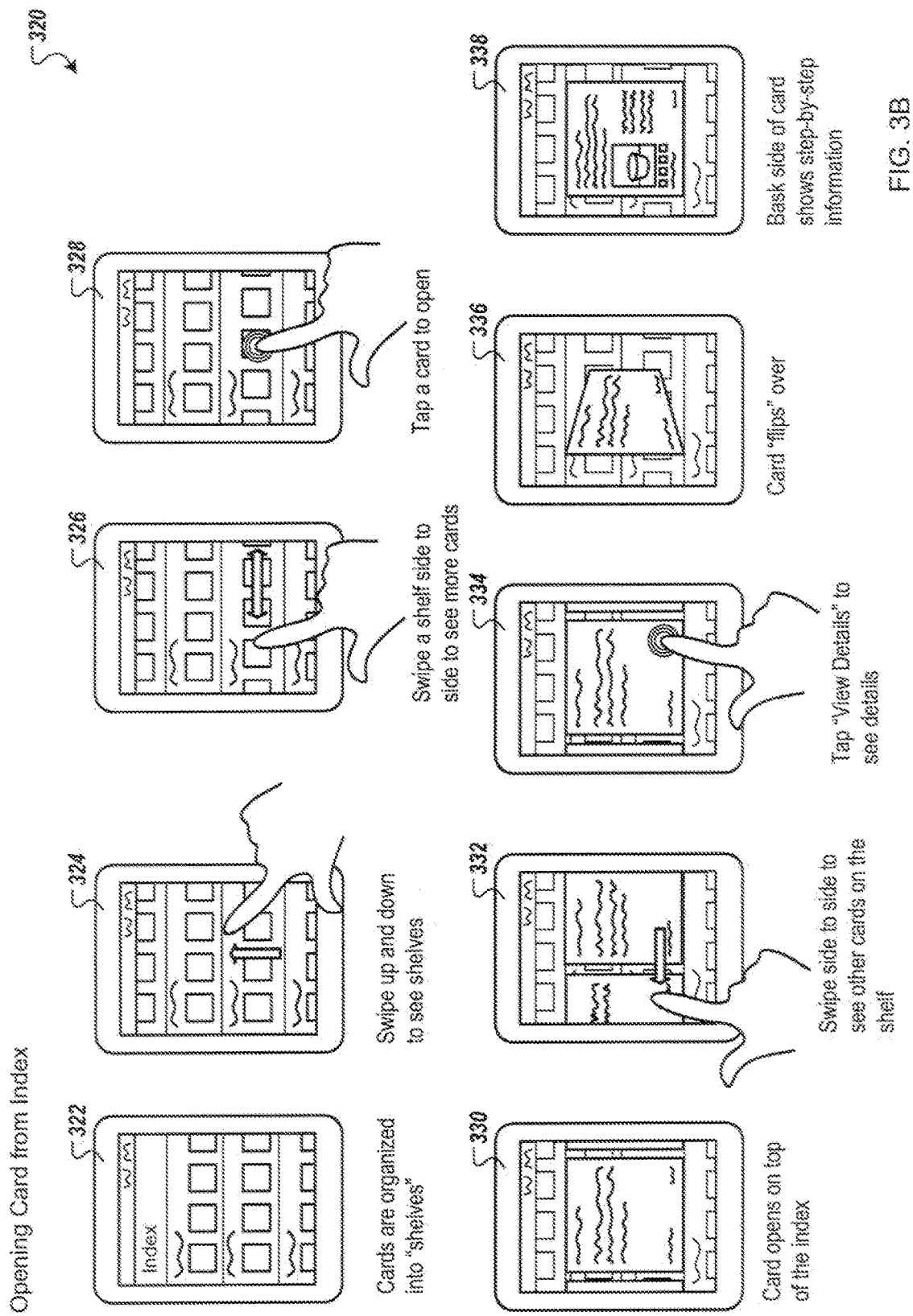

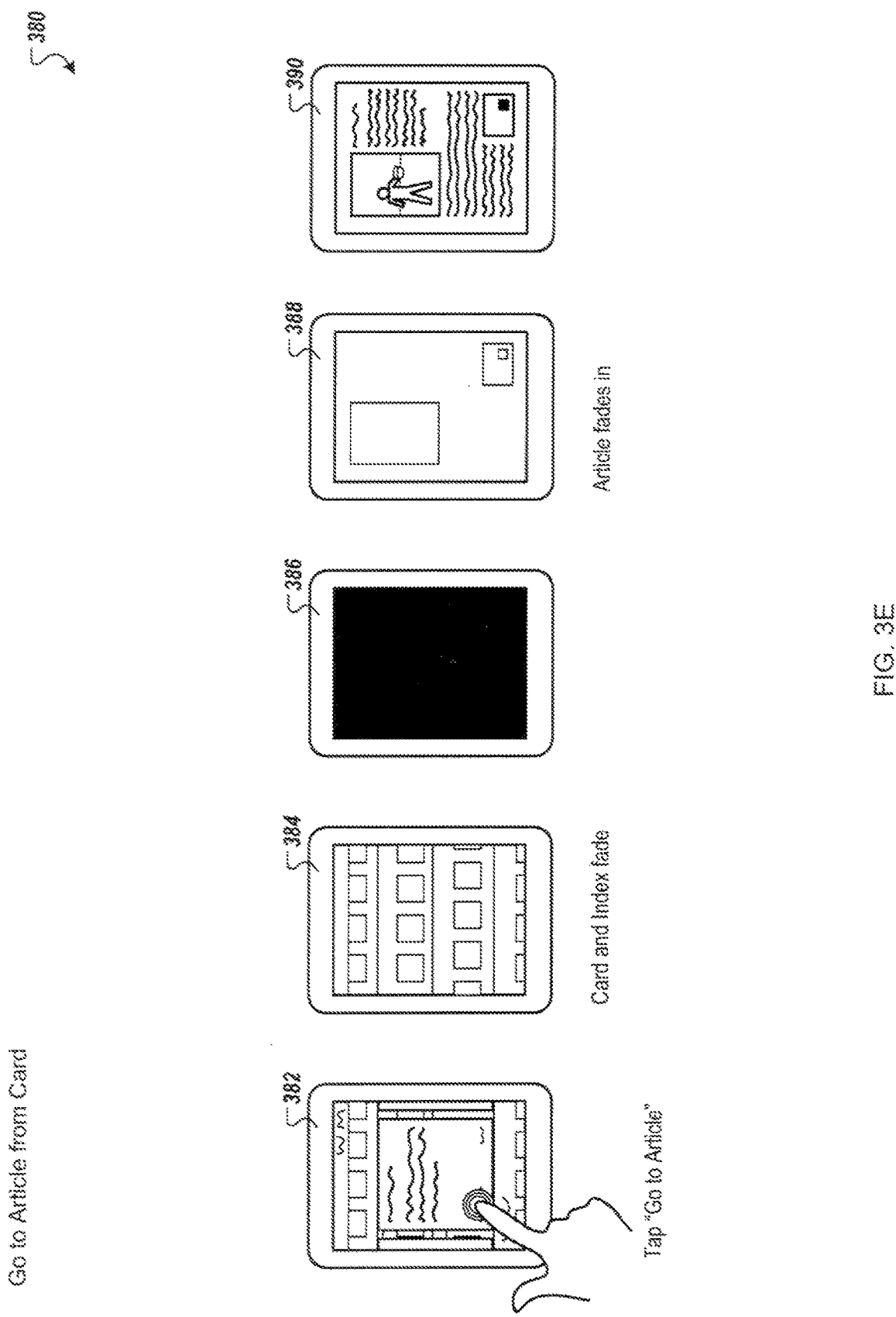

CONTENT AGGREGATION

TECHNICAL FIELD

This specification relates to electronic publishing and provision of digital media content.

BACKGROUND

Electronic publishing includes the digital publication of content such as electronic books, articles, and other media. Electronic publishers can widely distribute such content to users over the Internet. Recently, the use of tablet computers designed for accessing digital media content has increased, creating opportunities for subscription-based electronic magazines.

SUMMARY

This specification describes technologies relating to aggregating content from one or more electronic publication documents. In general, one innovative aspect of the subject matter described in this specification can be embodied in methods that include the actions of obtaining information including an index to content items of an electronic publication including a discrete package of received data that is stored locally, the content items being less than all content in the electronic publication received; retrieving, by a computer based on one or more criteria, two or more of the content items provided in disparate portions of the electronic publication, including the discrete package of received data, using the index; and presenting the two or more of the content items together on an output device in a user interface format different from that of the electronic publication. Other embodiments of this aspect include corresponding systems, apparatus, and computer programs, configured to perform the actions of the methods, encoded on computer storage devices.

These and other embodiments can each optionally include one or more of the following features. The discrete package of received data can be a first publication document, and the obtaining can include: retrieving first information corresponding to the first publication document; adding the first information to the index; retrieving second information corresponding to a second publication document published after the first publication document; and adding the second information to the index such that the index spans the first and second publication documents. The second publication document need not have been previously purchased, and the method can include: presenting the second information to a user with an option to purchase at least a portion of the second publication document.

The electronic publication can be a first electronic publication, and the second publication document can be from a second electronic publication different than the first electronic publication. Retrieving the two or more of the content items can include retrieving content items that each have a free data portion and a priced data portion, and presenting the two or more of the content items can include: displaying the free data portions of the content items in a user interface for the index; receiving a selection of one of the content items displayed in the user interface for the index; and revealing the priced data portion of the selected one of the content items in the user interface for the index. Moreover, presenting the two or more of the content items can include: determining that a user has not previously purchased a publication issue corresponding to the selected one of the content items; and transacting a purchase by the user of the previously unpurchased publication issue, or the selected one of the content items, before the revealing.

The method can include receiving input from a user specifying the one or more criteria. The method can include: receiving input from a user with respect to content referenced by the index; and storing the user input to personalize the index with respect to the user. Receiving input from a user can include receiving annotations to content referenced by the index. Receiving input from a user can include receiving category information to separate the content referenced by the index, and presenting the two or more of the content items can include presenting a portion of the content referenced by the index based on the category information. In addition, the method can include: receiving a request to communicate a portion of the information including the index to a third party; checking for authorization for the third party to receive the portion of the information including the index; and communicating the portion of the information including the index to the third party.

Another innovative aspect of the subject matter described in this specification can be embodied in a system that includes: a device; and one or more computers operable to interact with the device and programmed to perform operations including obtaining information including an index to content items of an electronic publication including a discrete package of received data that is stored locally for later local access, the content items being less than all content in the electronic publication received, retrieving, by a computer based on one or more criteria, two or more of the content items provided in disparate portions of the electronic publication, including the discrete package of received data, using the index, and presenting the two or more of the content items together on the device in a user interface format different from that of the electronic publication.

The discrete package of received data can be a first publication document, and the obtaining can include: retrieving first information corresponding to the first publication document; adding the first information to the index; retrieving second information corresponding to a second publication document published after the first publication document; and adding the second information to the index such that the index spans the first and second publication documents. Retrieving the two or more of the content items can include retrieving content items that each have a free data portion and a priced data portion, and presenting the two or more of the content items can include: displaying the free data portions of the content items in a user interface for the index; receiving a selection of one of the content items displayed in the user interface for the index; and revealing the priced data portion of the selected one of the content items in the user interface for the index.

The one or more computers can include a server operable to interact with the device through a data communication network, and the device can be operable to interact with the server as a client. Alternatively, the one or more computers can consist of one computer, the device can be a user interface device, and the one computer can include the user interface device.

Particular embodiments of the subject matter described in this specification can be implemented so as to realize one or more of the following advantages. A subscriber to an electronic magazine can be provided with an index that automatically aggregates content of interest from that electronic magazine, forming a growing repository of valuable information (e.g., recipes for cooking) for later use. This growing repository, or aggregation index, can also provide a user interface and functionality allowing interaction with the aggregated content. Content can be shared between multiple users by communicating information related to the index. Content can be annotated outside of the context of the magazine. Content can be searched. Content can include content purchased by users, or content not purchased by users, such as content acting as interactive advertisements.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-3E are examples of screens for a user interface of an aggregation index and an electronic magazine.

Like reference numbers and designations in the various drawings indicate like elements.

DETAILED DESCRIPTION

Figure 1:
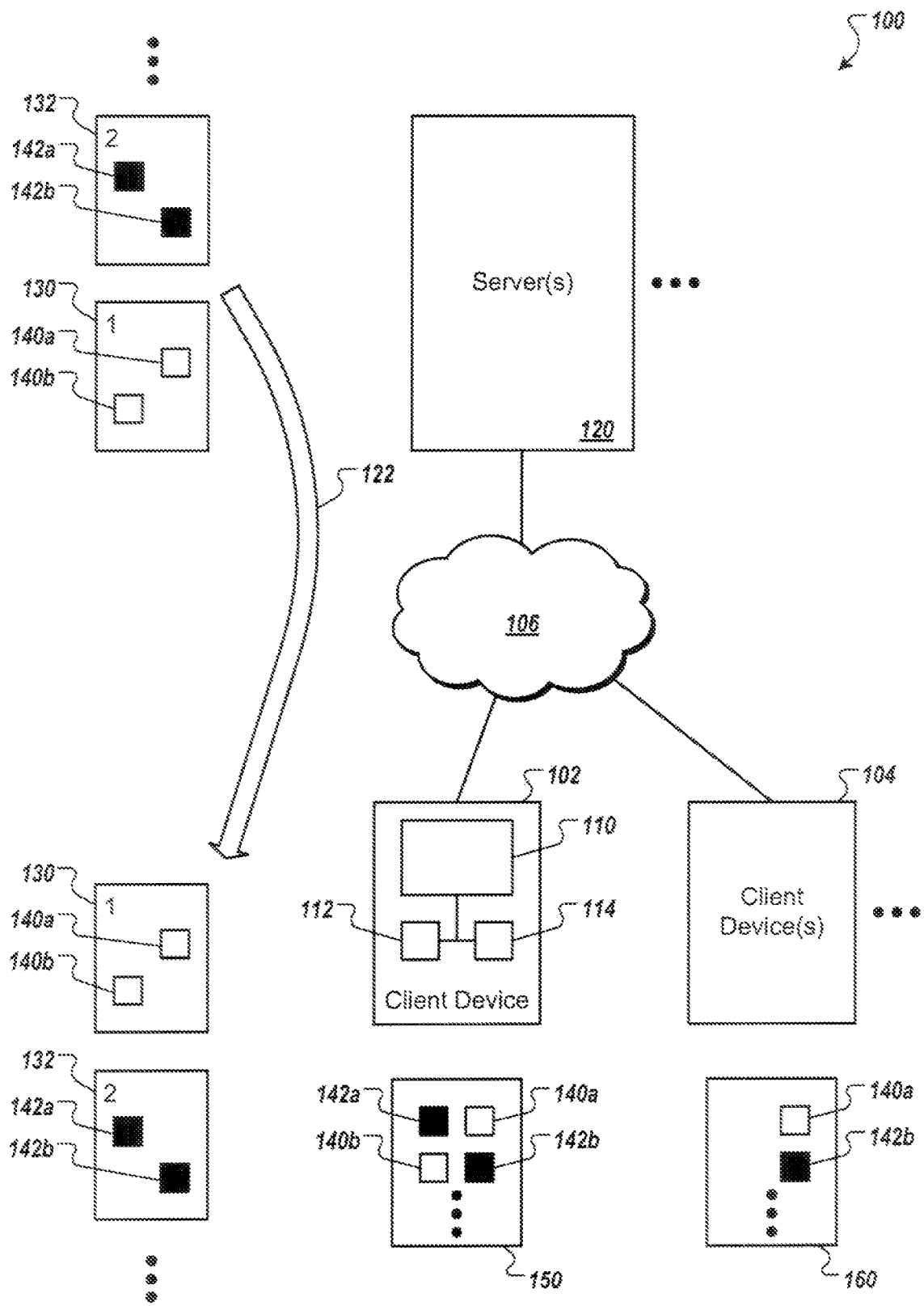
FIG. 1 is a diagram showing an example of a system in which content is aggregated and presented to a user.

FIG. 1 is a diagram showing an example of a system 100 in which content is aggregated and presented to a user. In general, the system 100 can include one or more client devices, such as a client device 102, and a client device 104. Each of the client devices 102, 104 can include one or more computers configured to obtain information associated with an index of an electronic publication, retrieve content items using the index, and present the content items in a format different from the electronic publication.

In more detail, the client devices 102, 104 may be any appropriate type of computing device (e.g., consumer electronic devices such as smart phones, personal digital assistants (PDAs), music players, e-book readers, tablet computers, notebook computers, laptop computers, desktop computers, or other stationary or portable devices) connected by wired or wireless links to a data communication network 106. Among other components, for example, the client devices 102, 104 may include one or more processors, computer readable storage mediums, input device(s) (e.g., keyboards, computer mice, touch screens, motion sensors, microphones, and the like), output device(s) (e.g., display screens, speakers, and the like), and communications interfaces. For example, the client device 102 can include a display 110, a processing unit 112, and a computer storage medium 114 encoded with a computer program including instructions that when executed cause the processing unit 112 to perform operations described in this specification. In various implementations, the described operations can be effected by an application used for viewing electronic publications, by a separate application installed on the client devices 102, 104, or by a cloud-based application accessed by the devices 102, 104 over the network 106.

The system 100 can include one or more servers 120. For example, the server(s) 120 can include a single server, server cluster, server farm, or other appropriate server configurations, and may be used by publishers to sell and distribute electronic publications. In some implementations, the server(s) 120 may include one or more servers for storing index information for the client devices 102, 104. In some implementations, the server(s) 120 and/or the client devices 102, 104 may communicate with each other to manage and share aggregation indices.

The client devices 102, 104, and the server(s) 120 can be communicatively coupled through the data communication network 106. The network 106 may include a wired network, a wireless local area network (WLAN) or WiFi network, a private network such as an intranet, a public network such as the Internet, or any appropriate combination thereof.

For purposes of illustration, a series of sample interactions are described here for aggregating content and presenting the content to a user. As shown by communications arrow 122, the client device 102 can receive discrete data packages 130 and 132. For example, each of the data packages 130, 132 may represent a publication document (e.g., an issue) in a series of publication documents of an electronic publication (e.g., an electronic magazine). As another example, each of the data packages 130, 132 may represent publication documents from different electronic publications. In some implementations, information associated with the data packages 130, 132 can be stored by the client device 102 (e.g., using the computer storage medium 114) for subsequent local access. In some implementations, information associated with the data packages 130, 132 can be stored by the server(s) 120.

The client devices 102, 104 can obtain information including indices to content items of the electronic publication including the discrete data packages 130, 132 (e.g., issues one and two of an electronic magazine). For example, content items can include text, audio, video, animation, games, and other such content. In the present example, the discrete data package 130 (e.g., issue one of the electronic magazine) includes content items 140a and 140b, and the discrete data package 132 (e.g., issue two of the electronic magazine) includes different content items 142a and 142b in different locations (e.g., different sections or pages). As shown, for example, an index 150 can be generated for the client device 102, including references to all content items 140a, 1406, 142a, and 142b of the received discrete data packages 130, 132. As another example, an index 160 can be generated for the client device 104, including references to less than all of the content items (e.g., content item 140a of the discrete data package 130, and content item 142b of the discrete data package 132). For each of the indices 150, 160, references to additional content items may later be added.

Various techniques may be used for referencing content items and building indices. In some implementations, content may be pushed to indices from publications, or pulled by indices from the publications. For example, the server(s) 120 can push content items 140, 142 to the indices 150, 160, or the indices can pull the items. In some implementations, content items may be copied from publication documents into a new location used by the indices. For example, the server(s) 120 or the client devices 102, 104 can copy the content items 140, 142 to either a local or remote location. In some implementations, content items may be kept in publication documents (local or remote) and an index may save information used to pull the content items from the publication documents as needed. For example, the content items 140a, 140b can be kept in the discrete data package 130, and the content items 142a, 142b can be kept in the discrete data package 132. Information used to pull the content items 140, 142 can be saved in the indices 150, 160, and can be used by the corresponding client devices 102, 104 to pull content items on the fly. In some implementations, indices can be used to store information related to aggregated content, information related to links to original articles in the electronic magazines from which content items were originally pulled, or information (e.g., titles, publication information, and the like) of other content items not currently owned by the index owner.

In the present example, two or more content items provided in disparate portions of the electronic publication can be retrieved by each of the client devices 102, 104, and the content items can be presented together on an output device in a user interface format different from that of the electronic publication. For example, using the index 150, the client device 102 can retrieve and present two or more of the content items 140a, 140b, 142a, and 142b. As another example, using the index 160, the client device 104 can retrieve and present the content items 140a and 142b. Thus, content items from originally disparate electronic publication source locations (e.g., different publications, different issues, different pages, and so forth), may be presented in association with each other by a user interface of a client device to a user.

Various distribution and payment models may be implemented by the system 100. For example, content distribution within the system 100 may be subscription-based, may be based on the purchase of individual electronic publications, may be based on the purchase of individual content items, may be used to advertise content to be purchased, or some combination of these.

Figure 2:
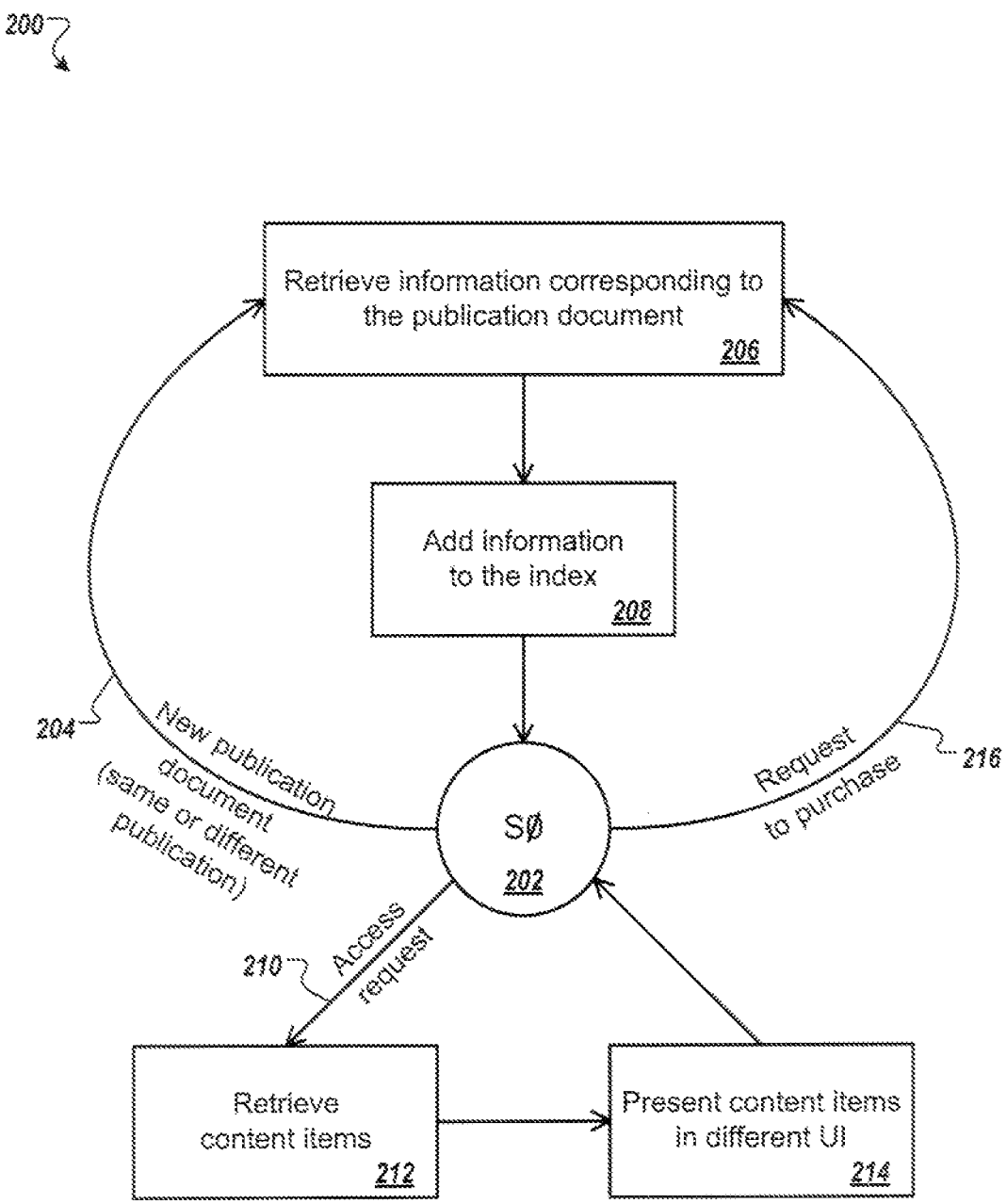
FIG. 2 is a state diagram showing an example of a process to aggregate and present content.

FIG. 2 is a state diagram showing an example of a process 200 to aggregate and present content. In general, from an initial state S0 202, various triggers can be received that initiate processing. Upon receiving the triggers, information corresponding to a publication document (e.g., an issue of an electronic magazine) can be retrieved and added to an index. Upon receiving a request to access information, content items can be retrieved and can be presented by a user interface different than the publication document. In some implementations, the process 200 may be performed by a computer system such as the system 100 or the client devices 102, 104 (shown in FIG. 1).

In more detail, from the initial state S0 202, a new publication document can be identified 204. For example, the publication document (e.g., an issue of an electronic magazine) can be from the same publication (e.g., the same magazine) as a previously identified publication document, or can be from a different publication (e.g., a different magazine).

Upon identifying the new publication document, information corresponding to the publication document can be retrieved 206, where the publication document is a discrete package of data that can be stored locally for later local access. For example, the information can include information associated with all the content items (e.g., text, audio, video, animation, games, and the like) of a particular type found in the publication document (e.g., all the recipes for meals found in an issue of an electronic magazine), or the information can include information associated with a proper subset of the content items (e.g., one or more articles from the issue covering a particular topic). The information can include the content items themselves, metadata regarding the content items (e.g., metadata used to retrieve content items from the publication document as needed at a later time), or both.

The information can be added 208 to an index to grow the index with the new content items found in the new publication document. As additional publication documents become available, information associated with the additional publication documents can be added to the index as well. For example, information corresponding with a first issue of an electronic magazine can be retrieved and added to an index. If a second issue of the electronic magazine is subsequently published, information corresponding with the second issue can also be retrieved and added to the index, such that the index spans the first and second issues of the magazine. As another example, information corresponding to an issue of a different electronic magazine can be retrieved and added to the index.

From the initial state S0 202, an access request 210 for the index can be received. Upon receiving the request for the index, a computer can use the index to retrieve 212 two or more of the content items originally provided in disparate portions of the electronic publication including the discrete package of received data. For example, if copies of the content items were previously made and saved in association with the index, the computer can retrieve the content items from the copies. As another example, the computer can retrieve the content items from the originally received publication document (i.e., the discrete package of data), from local storage, or from a remote server. In some implementations, the content items can be retrieved by the computer based on one or more criteria. For example, a computer user can provide one or more keywords related to content items to be added to the index.

The content items can be presented 214 together on an output device in a user interface format different from that of the electronic publication. In some implementations, the user interface may be related to the index. For example, content items related to a particular indexed topic (e.g., cooking, exercise, travel, and the like) from different electronic As shown in FIGS. 3A-3E, electronic cards can be called contextually from an article included in the electronic magazine or from the aggregation index. In some implementations, the cards can include general information on one side and more detailed information or instructions on the other side. For example, a card may include general recipe information and/or photos on the front of a card, and a list of ingredients and step-by-step instructions on the reverse side. In addition, the cards may be interactive. For example, the step-by-step instructions can include interactive media such as photos, audio, and video. Additional examples of uses of this framework include cards associated with an exercise magazine for weekly workout routines, cards associated with a craft magazine for building lamps, cards associated with a fashion magazine for makeup tutorials, cards associated with an interior design magazine for renovation ideas, cards associated with a wedding magazine for wedding planning ideas, cards associated with a travel magazine for planning a world tour, and so forth.

Figure 3A:
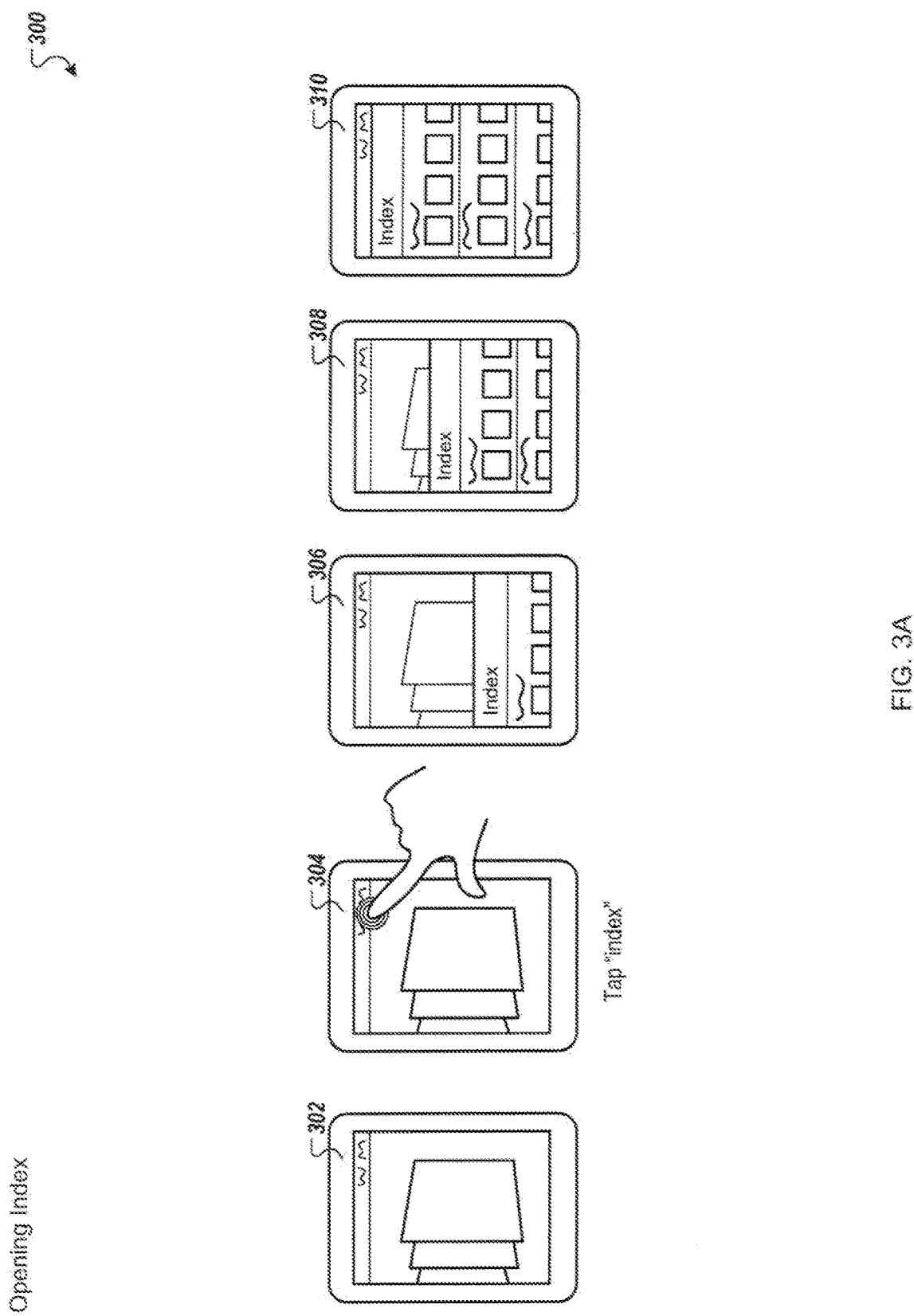

FIG. 3A shows a series of example screens 300 for opening an aggregation index. As shown in screen 302, a user interface is presented that can enable a user to interact with one or more software applications executed by a computing device (e.g., a tablet computer). In general, the user interface can include controls for receiving user input and for presenting application output. As shown in screen 304, the user may tap an "index" control to indicate an intention to open the aggregation index. As shown in the series of example screens 306, 308, and 310, an interface for the aggregation index slides from the bottom of the display and is presented to the user.

FIG. 3B shows a series of example screens 320 for opening a card from the aggregation index. As shown in screen 322, cards included in the index can be organized into multiple "shelves". For example, for an electronic magazine related to cooking, a shelf can include a set of recipe cards for main dishes, another shelf can include a set of cards for sides and salads, and so forth. As shown in screen 324, a user can use a vertical swiping motion to navigate to additional shelves, and as shown in screen 326, the user can use a horizontal swiping motion to navigate to additional cards on a shelf. The user can tap a particular card to select and open it, as shown in screen 328.

As shown in screen 330, the card opens on top of the aggregation index. For example, for a recipe-related card associated with the electronic cooking magazine, the cards magazine issues may be presented together or in association with each other on the output device.

In some implementations, information presented on the output device can include information (e.g., title, publisher, author, etc.) about one or more content items not yet owned by the user. For example, the output device can present a user interface including controls for browsing and purchasing content items. When a user interacts with a control for requesting to purchase 216 one or more content items, information corresponding to the content items can be retrieved 206 and added 208 to the index. For example, the user may request to purchase a single content item (e.g., an article, a portion of the article, or a media file associated with the article), multiple content items, an electronic magazine issue that includes the content item(s), or the entire electronic publication (e.g., past issues, and/or a subscription to future issues). In some implementations, a user interface for the index can include various mechanisms for sorting and filtering to allow the user to distinguish between owned content items and content items available for purchase.

FIGS. 3A-3E are examples of screens for a user interface of an aggregation index and an electronic magazine. For example, the user interface can be presented by an output device (e.g., a display screen) of a computer, such as the client computer 102 (shown in FIG. 1), and can be employed by a user to interact with software applications executed by the computer. In general, the format of the user interface for the aggregation index may be different than the format of the user interface for the electronic magazine. Such differences can include aspects of function, layout, and presentation. For example, the format of the user interface for the aggregation index can include content purchasing options and can include different controls for presenting and interacting with content. Also, the user interface for the aggregation index can present more or less content information as compared to content information presented by the electronic magazine interface.

The aggregation index can include content items owned by a user and content items available for purchase. For example, in addition to electronic magazine articles, content items can include video, audio, interactive graphics, or some combination of these. The aggregation index may be managed by a viewer application, in a separate application, or in an application available to one or more connected devices as a cloud computing application. can include general information, such as the name of the recipe, a photo, and a brief description. In some implementations, additional information may be presented, such as information related to the purchase of content not yet owned by the user. As shown in screen 332, the user can use a horizontal swiping motion to navigate to other cards on the shelf. As other cards scroll by, for example, the user can view the general information presented on card fronts. As shown in screen 334, the user can tap a "view details" control to receive additional details associated with the currently displayed card. The card can then flip over, as shown in screen 336, and the user can view the reverse of the card, as shown in screen 338. For example, the reverse of the recipe-related card can include a list of ingredients for the dish described on the front of the card, and a set of step-by step instructions for preparing the dish.

Figure 3C:
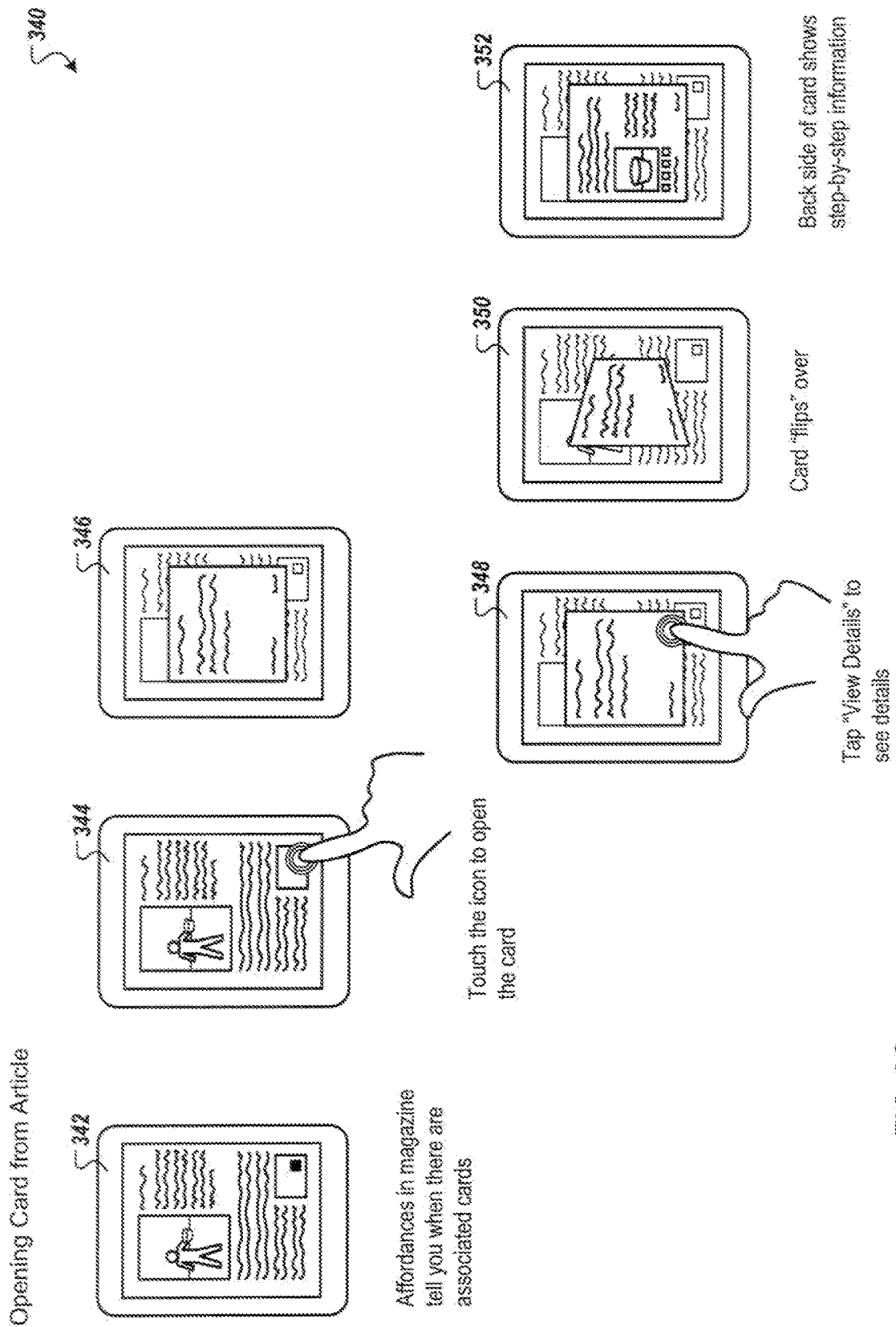

FIG. 3C shows a series of example screens 340 for opening a card from an article in the user interface of an electronic magazine. As shown in screen 342, a user interface is presented enabling a user to interact with an article included in an issue of an electronic magazine. In some implementations, electronic magazine articles may include one or more affordances (e.g., icons) showing the user when cards including information related to the article are available. For example, the article shown in screen 342 may be related to preparing a holiday dinner. When one or more cards including recipe information for items included in the dinner are available, for example, the article can present icons to the user for opening the cards. As shown in screen 344, for example, to select and open a card including recipe information for mashed potatoes, the user can touch the corresponding icon. The selected card can be displayed on top of the article, as shown in screen 346, and the user can tap a "view details" control to receive additional details associated with the currently displayed card, as shown in screen 348. The card then flips over and presents the additional details, as shown in screens 350 and 352.

Figure 3D:
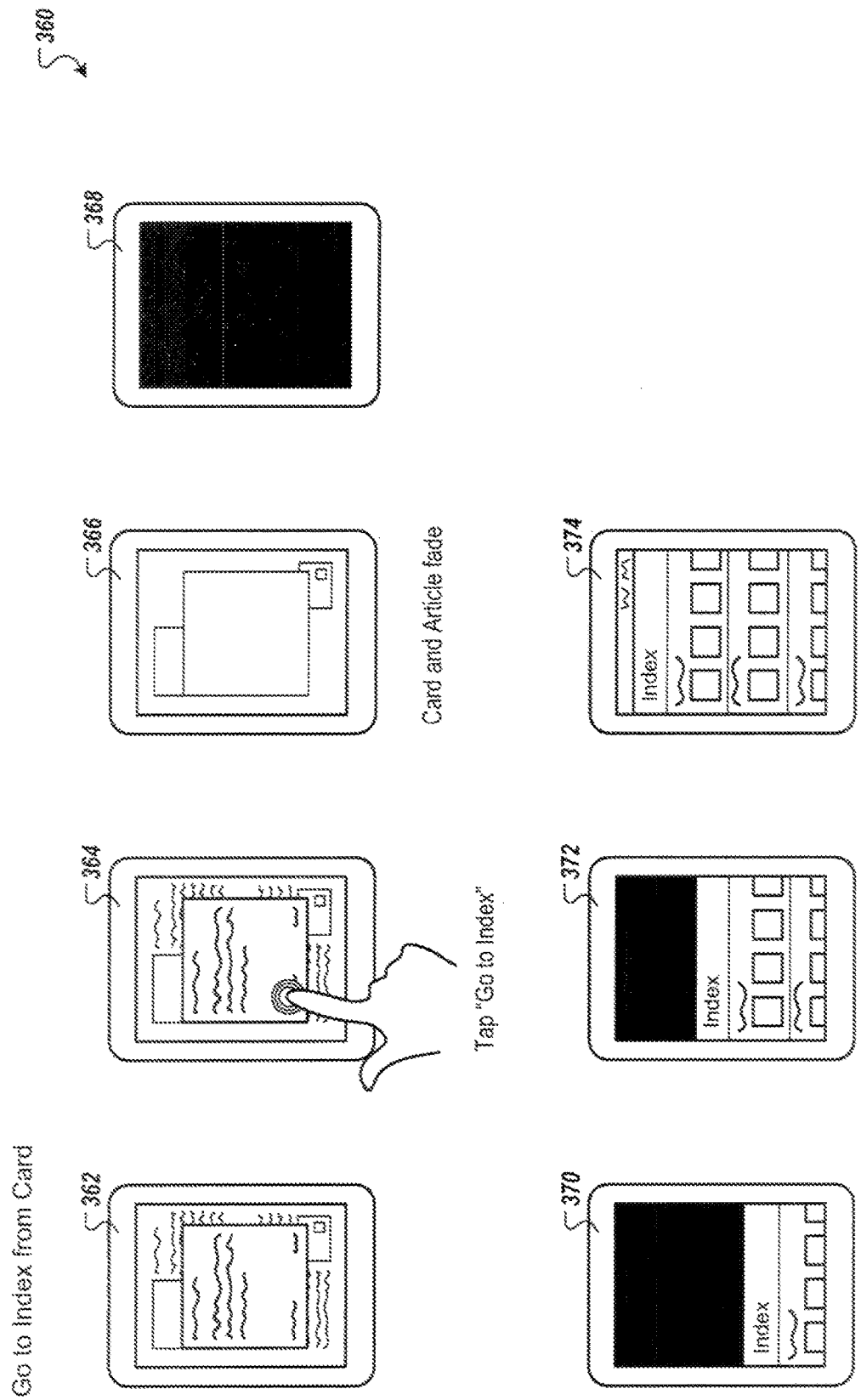

FIG. 3D shows a series of example screens 360 for navigating to the aggregation index from a card. As shown in screen 362, a card is presented on top of an associated article to a user. As shown in screen 364, the user can tap a "go to index" control to navigate to the aggregation index. As shown in screens 366 and 368, the card and article fade. The aggregation index then slides from the bottom of the display and is presented to the user, as shown in the series of screens 370, 372, and 374. In some implementations, the user may be returned to an index position associated with the previously presented card. For example, the previously presented card (e.g., a card including recipe information for mashed potatoes) may be located on a "shelf" associated with recipes for side dishes. Upon returning to the side dish "shelf", for example, the user can navigate to cards including other side dish recipes.

FIG. 3E shows a series of example screens 380 for navigating to an article from a card. As shown in screen 382, a card including a link to an associated article is presented on top of the aggregation index. For example, the article may be a source article for the card content, or the article may include content related to the card content. A user can tap a "go to article" control (e.g., the link) to navigate to the article. As shown in the series of screens 384, 386, 388, and 390, the card and index can fade out, and the article can fade in.

The cards shown in the example screens illustrated in FIGS. 3A-3E are one possible implementation for providing contextual information from an aggregation index and an electronic magazine. Other implementations may employ different sorts of user interfaces, and/or different types of content items. For example, in addition to text content, audio and video content associated with various articles may be indexed and presented.

Figure 4:
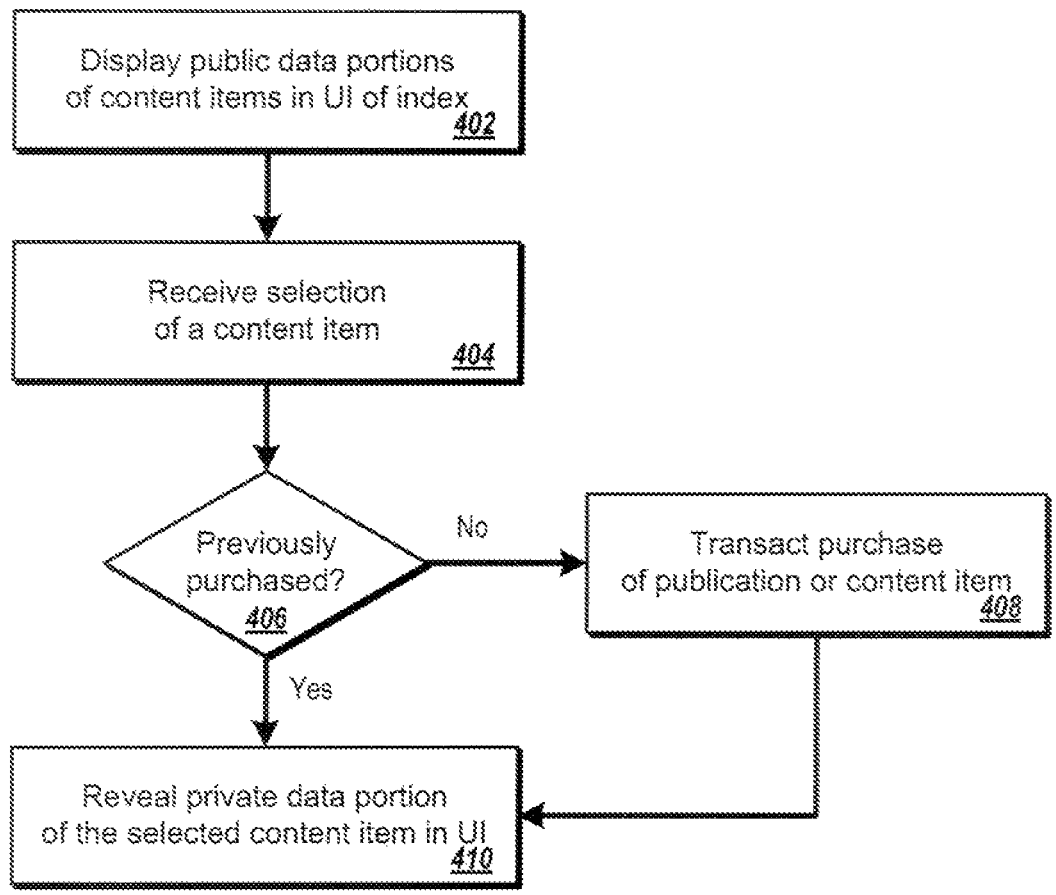
FIG. 4 is a flowchart showing an example of a process to present aggregated content.

FIG. 4 is a flowchart showing an example of a process 400 to present aggregated content. Briefly, the process 400 includes displaying free data portions of content items in a user interface of an index, receiving selection of a content item, determining whether the content item has been previously purchased, and transacting a purchase (as needed), and revealing a priced data portion of the selected content item in the user interface. In some implementations, techniques for displaying free data portions and priced data portions of content items in the user interface can be implemented as shown in FIGS. 3A-3E, and will be described as such for clarity. Other implementations are also possible.

In more detail, free data portions of content items can be displayed 402 in a user interface of an index. Referring to FIG. 3B, for example, screen 332 shows a user navigating between multiple index cards. The index cards can include such free information as titles, photos, and general descriptions. By viewing the free data portions of content items, for example, the user can determine which of the content items he or she would like to select for further review or for purchase. In some implementations, a content item may be associated with a visual indicator designating whether the item has been previously purchased. For example, the index card shown in screen 332 may include text, a particular graphic or color, or some other sort of visual indicator referring to the current state of ownership.

Referring again to FIG. 4, selection of a content item can be received 404 of one or more of the content items displayed in the user interface for the index. For example, as shown in screen 334 (of FIG. 3B), the user can tap a "view details" control of an index card to indicate an intention to select the index card for further review. In some implementations, if the content item is determined to be previously purchased 406, the priced data portion of the selected content item can be revealed 410 in the user interface for the index. For example, as shown in screens 336 and 338 (of FIG. 3B), the selected index card can be visually flipped over to reveal the reverse of the card.

In some implementations, if a content item has not been previously purchased, a purchase of the content item can be transacted. For example, it may be determined that the user has not previously purchased 406 a selected content item, or has not previously purchased a publication issue corresponding to the selected content item. In this case, for example, a purchase by the user of the selected content item or the previously unpurchased publication issue can be transacted 408. For example, the user may access a personal account associated with his or her index to manage financial transactions for purchasing publications and associated content. Upon completing the transaction, for example, the priced data portion of the selected content item can be revealed 410 in the user interface.

Figure 5:
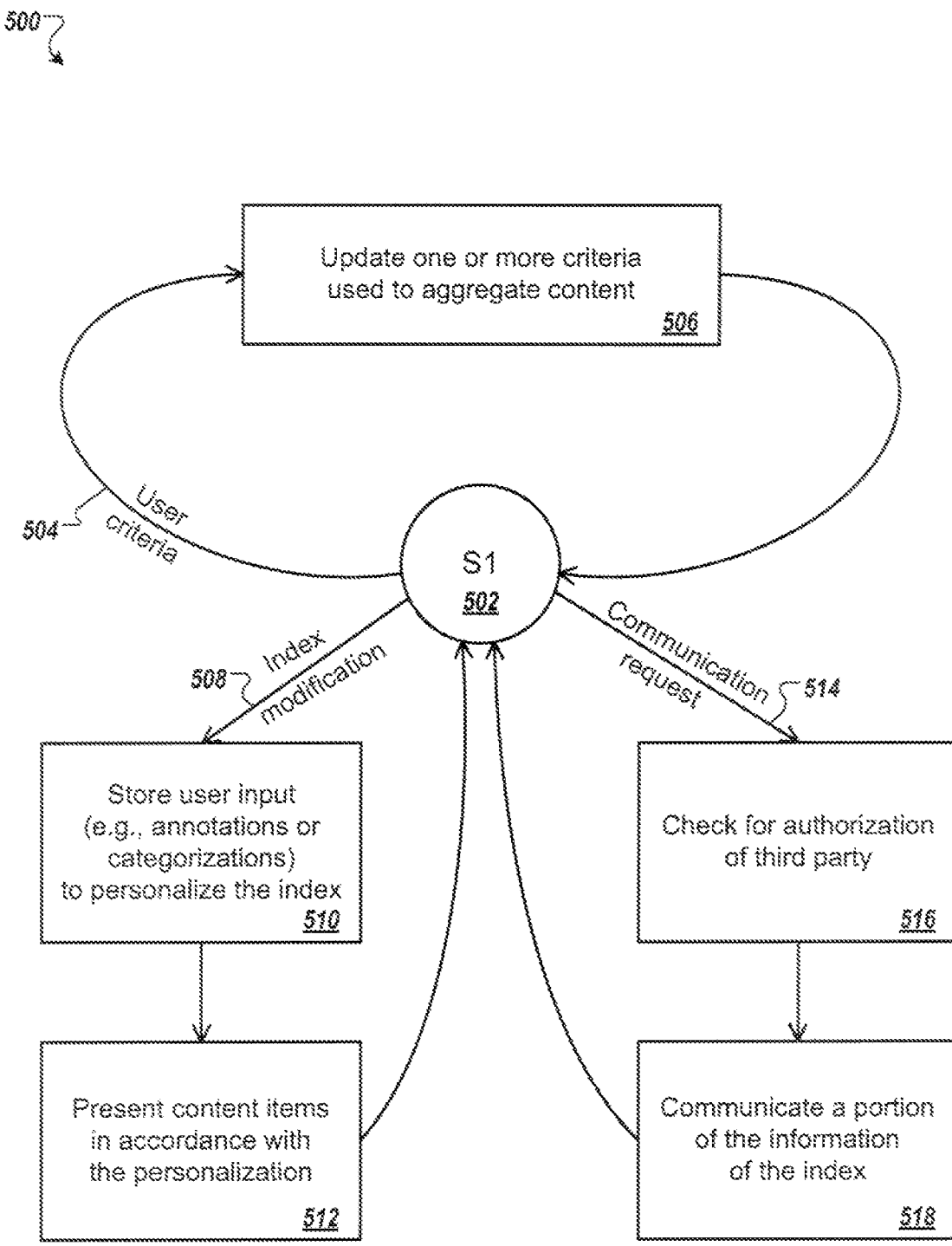
FIG. 5 is a state diagram showing an example of a process to manage and share an aggregation index.

FIG. 5 is a state diagram showing an example of a process 500 to manage and share an aggregation index. In general, from an initial state S1 502, various triggers can be received that initiate processing, including user criteria, index modifications, and communications requests.

In more detail, from the initial state S1 502, user criteria can be received 504. For example, the user can specify which categories (e.g., cooking, fitness, travel, etc.) of electronic publication content items to aggregate in his or her index. As another example, the user can specify which content formats (e.g., text, audio, video, etc.) to aggregate. As another example, the user can specify which electronic publications (e.g., electronic magazines) may include content items for aggregation.

In some implementations, a specified category of content items for aggregation can include various subcategories, and the user can specify subcategories for aggregation. For example, a cooking category can include a recipe subcategory, which can include a vegetarian sub-subcategory. As another example, a fitness category can include a cardiovascular training subcategory, which can include a trail running sub-subcategory. As another example, an architecture category can include a renovations subcategory, which can include a plumbing projects sub-subcategory. In some cases, categories and subcategories can be identified using predefined tags included in electronic publication documents. In some cases, categories and subcategories can be specified separate from any particular electronic publication, and the categories and subcategories can be applied to any electronic publication document. For example, the user can provide one or more keywords associated with topics of interest.

Based on the user criteria, one or more criteria used to aggregate content can be updated 506. In some implementations, the user criteria (e.g., category/subcategory information, content formats, and content publishers) can be used to separate content referenced by the index. For example, a portion of the content referenced by the index can be presented based on category/subcategory information, content format, and/or content publishers.

In some implementations, the user may specify rules governing which content items are to be included for aggregation. The rules, for example, can be based on one or more of the criteria used to aggregate content, and can be used to extract content from electronic publications based on specific keywords. For example, the user can specify a rule excluding recipes having milk as an ingredient from the aggregated index. As another example, the user can specify a rule limiting the aggregated recipes to only include recipes from a particular publisher that include video demonstration content and feature low-caloric dishes.

From the initial state S1 502, index modifications can be received 508, with respect to content referenced by the user. Based on the index modifications, user input can be stored 510 to personalize the index with respect to the user. In some implementations, input received from the user can include annotations to content referenced by the index. For example, content annotations can include such information as ratings and reviews. Such annotations to content referenced by the index can be metadata stored in the index and overlaid on a content item as needed, or such annotations can be stored directly with a copy of the content item, such as when a content item is a PDF (Portable Document Format) document and an annotation is added into the PDF document, which is itself store in the index. Furthermore, the index modifications can also include index reorganization or re-categorization information indicating user preferences (e.g., a user playlist, such as a set of workout exercises).

Content items can be presented in accordance with the personalization 512. In some cases, annotations or preference metadata can be retrieved from the index and overlaid on a content item. For example, reviews associated with a particular recipe can be retrieved from the index and presented in associated with the recipe. In some cases, the preference metadata can be used for presenting related content items. For example, a set of recipes for preparing a particular meal can be grouped and presented together. As another example, a set of exercise videos can be grouped together and presented in a preferred sequence.

From the initial state S1 502, a communication request can be received 514, to communicate a portion of the information included in the index to a third party. Upon receiving the communication request, authorization for the third party to receive the portion of the information can be checked 516. For example, a user can request to share a particular aspect of a content item (e.g., annotations associated with a recipe) with a friend, and a check can be performed to determine whether the friend also owns the content item. If so, the requested sharing may proceed. If not, in some implementations, the friend may be presented with a prompt to purchase the content item so the requested sharing may proceed. As another example, a user can post a reference on a social networking site to a content item included in his or her index. If another user requests to access the content item, a check can be performed to determine whether the requestor also owns the content item before proceeding. If so, the request for content may proceed. If not, in some implementations, the requestor may be enabled to purchase the content item.

If the third party (e.g, a friend or requestor) is approved, for example, a portion of the information of the index may be communicated 518. For example, friends can share recipe annotations associated with a particular recipe. As another example, requestors of content items posted on social networking sites can access the requested items. In some implementations, sharing and synchronizing content among various users, applications, and websites can enable additional functionality related to the content. For example, multiple users can collaboratively create a custom index (e.g., a family cook book). As another example, content item information can be provided to a service application for physical production (e.g, printing) or physical distribution of the content.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices;

magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
generating a collective index to digital content items of electronic publications, the collective index generated by a computer device and stored locally on the computer device, the digital content items being a subset of all content in the electronic publications, the computer device generating the collective index by:
retrieving, from a first server device, first index information corresponding to a first digital content item of a first electronic publication;
adding the first index information to the collective index;
receiving second index information corresponding to a second digital content item of a second electronic publication, the second index information being pushed to the computer device from a second server device based on the server device determining index criteria of the digital content items in the collective index; and
adding the second index information to the collective index such that the collective index spans the first and second electronic publications;
responsive to a user-initiated input specifying a search with one or more keywords, retrieving, by the computer device and from at least one of the first and second server devices, at least two items of the digital content items according to the one or more keywords and by using the collective index; and
presenting the at least two of the digital content items together for display on an output device of the computer device in a user interface format related to the collective index, the user interface format different from that of the first and second electronic publications, the user interface format including displayed controls for interaction with the digital content items.

2. The method of claim 1, wherein the second electronic publication is published after the first electronic publication.

3. The method of claim 2, wherein the second electronic publication has not been previously purchased, and the method further comprises:
presenting the second index information to a user with an option to purchase at least a portion of the second electronic publication.

4. The method of claim 1, wherein the first electronic publication is different than the second electronic publication.

5. The method of claim 1, wherein each of the at least two digital content items has a free data portion and a priced data portion, and presenting the at least two of the digital content items comprises:
displaying the free data portion of the digital content items in a user interface for the collective index;

receiving a selection of one of the digital content items displayed in the user interface for the collective index; and revealing the priced data portion of the selected one of the digital content items in the user interface for the collective index.

6. The method of claim 5, wherein presenting the at least two of the digital content items comprises:

determining that a user has not previously purchased a publication issue corresponding to the selected one of the digital content items; and transacting a purchase by the user of the previously unpurchased publication issue, or the selected one of the digital content items, before the revealing.

7. The method of claim 1, wherein:

the one or more keywords are related to the digital content items of the first and second electronic publications; and the user interface format difference includes one or more of different functionality, different layout, and different presentation.

8. The method of claim 1, further comprising:

receiving input from a user with respect to the digital content items referenced by the collective index; and storing the user input to personalize the collective index with respect to the user.

9. The method of claim 8, wherein receiving the input from the user comprises receiving annotations to the content of the digital content items referenced by the collective index.

10. The method of claim 8, wherein receiving the input from the user comprises receiving category information to separate the digital content items referenced by the collective index, and said presenting the at least two of the digital content items comprises presenting a portion of the content referenced by the collective index based on the category information.

11. The method of claim 1, further comprising:

receiving a request to communicate a portion of the information comprising the collective index to a third party;

checking for authorization for the third party to receive the portion of the information comprising the collective index; and communicating the portion of the information comprising the collective index to the third party.

12. A non-transitory computer-readable memory comprising stored instructions that when executed by a processor of a computer device cause the processor to perform operations comprising:

generating a collective index to digital content items of electronic publications, the collective index stored locally on the computer device for later local access, the digital content items being a subset of all content in the electronic publications, the computer device generating the collective index by:

receiving input from a user with respect to one or more of the digital content items referenced by the collective index;

storing the user input to personalize the collective index with respect to the user;

retrieving, from a first server device, first index information corresponding to a first digital content item of a first electronic publication;

adding the first index information to the collective index;

receiving second index information corresponding to a second digital content item of a second electronic publication, the second index information being pushed to the computer device from a second server device based on the server device determining index criteria of the digital content items in the collective index; and adding the second index information to the collective index such that the collective index spans the first and second electronic publications;

responsive to a user-initiated input specifying a search with one or more keywords, retrieving, by the computer device and from at least one of the first and second server devices, at least two items of the digital content items according to the one or more keywords and by using the collective index; and presenting the at least two of the digital content items together for display on an output device of the computer device in a user interface format related to the collective index, the user interface format different from that of the first and second electronic publications, the user interface format including displayed controls for interaction with the digital content items.

13. The non-transitory computer-readable memory of claim 12, wherein said receiving the input from the user comprises receiving at least one of:

criterion related to a category of the at least two of the digital content items;

criterion specifying content format of the at least two of the digital content items; or criterion specifying the electronic publication of the at least two of the digital content items.

14. The non-transitory computer-readable memory of claim 12, wherein the second electronic publication has not been previously purchased, and the operations further comprising:

presenting the second index information to a user with an option to purchase at least a portion of the second electronic publication.

15. The non-transitory computer-readable memory of claim 12, wherein each of the at least two digital content items has a free data portion and a priced data portion, and presenting the at least two digital content items comprises:

displaying the free data portion of the digital content items in a user interface for the collective index;

receiving a selection of one of the digital content items displayed in the user interface for the collective index; and revealing the priced data portion of the selected one of the digital content items in the user interface for the collective index.

16. A system comprising:

a computer device; and a server operable to interact with the computer device via a data communication network and the server configured to:

generate a collective index to digital content items of electronic publications, the collective index comprising a discrete package of received data that is stored locally for later local access, the received data comprising first index information corresponding to a first digital content item of a first electronic publication, and the received data comprising second index information corresponding to a second digital content item of a second electronic publication, the second index information being pushed to the computer device from the server based on the server determining index criteria of the digital content items in the collective index spanning the first and second electronic publications and the digital content items being a subset of all content in the first and second electronic publications;

responsive to a user-initiated input specifying a search with one or more keywords and by using the collective index, retrieve at least two items of the digital content items according to the one or more keywords, including the discrete package of received data;

present the at least two of the digital content items together for display on the computer device in a user interface format related to the collective index, the user interface format different from that of the first and second electronic publications, the user interface format including displayed controls for interaction with the digital content items;

receive user annotations from the computer device with respect to the at least two digital content items; and store the user annotations to personalize the collective index with respect to the user.

17. The system of claim 16, wherein:

the one or more keywords are related to the digital content items of the first and second electronic publications; and the user interface format difference includes one or more of different functionality, different layout, and different presentation.

18. The system of claim 16, wherein each of the at least two digital content items has a free data portion and a priced data portion, and wherein the computer device is configured to:

display the free data portion of the digital content items in a user interface for the collective index;

receive a selection of one of the digital content items displayed in the user interface for the collective index; and reveal the priced data portion of the selected one of the digital content items in the user interface for the collective index.

19. The system of claim 16, wherein the server is configured to:

receive a request to communicate a portion of the collective index to a third party;

check for authorization for the third party to receive the portion of the collective index; and communicate the portion of the collective index to the third party via the data communication network.

20. The system of claim 16, wherein the server comprises one or more computers and the computer device is a user interface device.

* * * * *